(12) United States Patent
Nelson et al.

(10) Patent No.: US 6,506,491 B2
(45) Date of Patent: Jan. 14, 2003

(54) YARN BLEND FOR FRICTION APPLICATIONS

(75) Inventors: Arthur Russell Nelson, Midlothian, VA (US); Reginald Thomas Kruszewski, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/128,724

(22) Filed: Apr. 22, 2002

(65) Prior Publication Data

US 2002/0155287 A1 Oct. 24, 2002

Related U.S. Application Data

(60) Continuation of application No. 09/619,330, filed on Jul. 19, 2000, now abandoned, which is a division of application No. 09/235,424, filed on Jan. 22, 1999, now Pat. No. 6,132,866.
(60) Provisional application No. 60/073,305, filed on Jan. 28, 1998, and provisional application No. 60/086,776, filed on May 26, 1998.

(51) Int. Cl.[7] .................................................. D02G 3/00
(52) U.S. Cl. ...................................................... 428/359
(58) Field of Search ........................... 57/243, 244, 252, 57/255, 256; 384/300, 911, 900; 428/357, 359, 361, 364, 370, 373

(56) References Cited

U.S. PATENT DOCUMENTS

| 3,804,479 A | | 4/1974 | Butzow et al. |
| 3,844,195 A | | 10/1974 | Rhodes et al. |
| 5,631,085 A | * | 5/1997 | Gebauer ..................... 428/377 |
| 6,132,866 A | * | 10/2000 | Nelson et al. ............. 428/359 |

FOREIGN PATENT DOCUMENTS

| JP | 01-139833 A | 6/1989 |
| WO | 94/21846 | 9/1994 |

* cited by examiner

Primary Examiner—Cynthia H. Kelly
Assistant Examiner—J. M. Gray

(57) ABSTRACT

A staple yarn comprising a blend of 35 to 90 weight percent fluoropolymer fiber and 65 to 10 weight percent of one or more types of blend fiber.

11 Claims, 1 Drawing Sheet

YARN BLEND FOR FRICTION APPLICATIONS

Figure 1A:
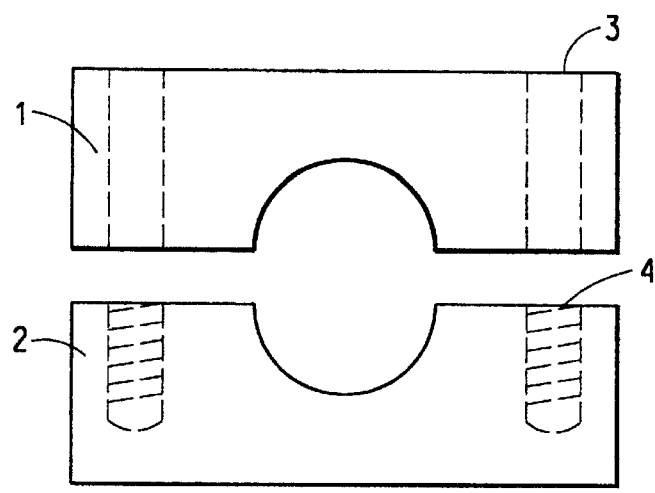

This application is a continuation of Ser. No. 09/619,330 filed Jul. 19, 2000, now abandoned, which is a division of Ser. No. 09/235,424 filed Jan. 22, 1999, now U.S. Pat. No. 6,132,866, which claims priority to two earlier filed and co-pending provisional applications: application no. 60/073,305 filed Jan. 28, 1998 and application no. 60/086,776 filed May 26, 1998.

This invention relates to a spun staple yarn having improved frictional characteristics.

BACKGROUND OF THE INVENTION

Fluoropolymer fibers are known as friction modifiers in many different end uses. However, fluoropolymer fibers have low tensile modulus and are characterized by low adhesion to other resins; they are relatively high cost products, and some fluoropolymer are characterized by a tendency to cold flow. When used as a friction modifier in industrial applications, such as bearings, fluoropolymer fibers typically take one of the following forms: continuous fluoropolymer filament yarn wound around the surface of an article or part, continuous fluoropolymer filament yarn knitted or woven into fabrics, or continuous fluoropolymer filament yarn chopped into very short floc; this floc is then mixed with a resin and molded into articles or parts.

Although a fluoropolymer staple yarn offer advantages compared to the continuous filament yarn, heretofore, it has too difficult to make a spun fluoropolymer staple yarn. With a commercially viable spun staple fluoropolymer yarn, yarns and fabrics which use staple fibers having various cut lengths could be designed to meet the needs of industrial friction reducing applications.

Japanese Patent Application HEI 1[1989]-139833 discloses a fiber material having good flexibility made by mixing less than 30% polytetrafluoroethylene fibers or strands with natural and/or synthetic fibers. Fabrics and clothing made with the fiber material of this publication have both good draping and improved anti-pilling properties.

SUMMARY OF THE INVENTION

The present invention is a staple yarn comprising a blend of 25 to 90 weight percent fluoropolymer fiber and 75 to 10 weight percent of one or more types of blend fiber. The yarn or fabrics made from the yarn of the present invention function as friction modifiers in load-bearing products such as fabric liners for rubber parts, composite and fabric bearings, and sealing materials.

DETAILED DESCRIPTION

The present invention relates to a spun staple yarn having improved frictional characteristics and the load-bearing and other products products which may be made using this yarn as a component. The spun staple yarns of this invention are a combination of fluoropolymer fibers and blend fibers.

By "spun staple yarn" with reference to a synthetic fiber, it is meant yarn which is made by cutting continuous filament yarn or a continuous tow to a specified length to make a staple fiber and then processing it through common cotton system equipment to form a yarn from the staple. Common method used to make staple yarn include ring-spinning, open-end spinning, and air-jet spinning.

By "fluoropolymer" it is meant polymers such as poly(tetrafluoroethylene), abbreviated "PTFE" herein, and polymers generally known as fluorinated olefinic polymers, for example, copolymers of tetrafluoroethylene and hexafluoropropene (FEP), copolymers of tetrafluoroethylene and perfluoroalkyl-vinyl esters such as perfluoropropyl-vinyl ether (PFA) and perfluoroethyl-vinyl ether, fluorinated olefinic terpolymers including those of the above-listed monomers and other tetrafluoroethylene based copolymers. For the purposes of this invention the preferred fluoropolymer is PTFE.

Fluoropolymer continuous filament may be spun by a variety of means, depending on the exact fluoropolymer composition desired. The fibers may be spun by dispersion spinning; that is, a dispersion of insoluble fluoropolymer particles is mixed with a solution of a soluble matrix polymer, and this mixture is then coagulated into filaments by extruding the mixture into a coagulation solution in which the matrix polymer becomes insoluble. The insoluble matrix material may later be sintered and removed if desired. Alternatively, if melt viscosities are amenable, filament may also be spun directly from a melt. Fibers may also be produced by mixing fine powdered fluoropolymer with an extrusion aid, forming this mixture into a billet and extruding the mixture through a die to produce fibers which may have either expanded or un-expanded structures.

After the spinning process, the continuous filament fibers are then cut to staple lengths in the range of 0.5 to 3.0 inches. For the purposes of this invention the preferred staple length is from 1.5 to 2.0 inches. Denier per filament may range from 0.1 to 6.0.

By "blend fiber" is meant commonly available fibers including polyesters, polyamides, aromatic polyamides, polypropylenes, polyethylenes and their copolymers; natural fibers such as cotton, rayon, and wool; fibers made from high performance polymers including poly(para-phenylene terephthalamide(PPD-T), poly(para-phenylene benzobisoxazole (PBO), ultrahigh molecular weight polyethylene (UHMWPE), anisotropic melt polyesters; and high modulus fibers such as carbon fibers, metal fibers and glass fibers and any of the previously mentioned classes or types of fibers with special coatings, such as metal-coated para-aramid fibers. The cut staple lengths of the blend fiber may be any length which is compatible with the fluoropolymer staple. For the purposes of this invention, the preferred staple length is equal to or less than that of the fluoropolymer staple and is the range of 0.5 to 2.0 inches.

The fluoropolymer staple fiber and the blend staple fiber are combined and processed into a staple yarn using conventional methods. For example, the required amounts of each staple fiber can be blended together and then opened and carded to produce a carded sliver. The carded sliver can then be drawn and further attenuated into a roving and finally ring spun into a staple yarn.

The yarns of the present invention contain 25 to 90 weight percent fluoropolymer fiber and 75 to 10 weight percent blend fiber. A preferred weight distribution is 35 to 75 weight percent fluoropolymer content; 65 to 25 weight percent blend fiber content. A more preferred weight distribution is 35 to 65% fluoropolymer, 65 to 35% blend fiber. The practical frictional benefits of the fiber are reduced when the fluoropolymer content is below 35 weight percent for most industrial end uses. Above 90 weight percent fluoropolymer content, a usable staple fiber yarn is more difficult to produce since filament to filament cohesion in the yarn bundle is low. Also the yarn becomes less cost effective. A preferred yarn of the present invention is a 50 weight percent PTFE and 50 weight percent blend fiber. The preferred blend fiber is polyester fiber.

The yarns of this invention have a low yarn-to-metal coefficient of friction and allow the tailoring of both yarn structure and fiber content for the particular load-bearing application. For example, the blend fiber may be selected to increase an inherent deficiency in fluoropolymer fiber, such as low modulus by selecting as the blend fiber a high modulus fiber. If desired, continuous filament yarns can be added to the staple yarn of this invention to provide additional strength or wear properties. For example, one or more continuous filament yarns can be used as core yarns with the blended staple fibers substantially wrapped or overspun around these yarns. If very high tenacity yarns with improved frictional or noise reduction properties are desired, a high tenacity continuous filament yarn could by wrapped by the staple fiber composition of the present invention. Alternatively, the blended staple fiber can first be made and then plied with the continuous filament yarns. It is also possible for one or more continuous filament yarns to substantially wrap the blended staple yarns. For example, a continuous filament thermoplastic yarn could wrap a fluoropolymer and thermoplastic blended staple yarn wherein the filament yarn would act as a sacrificial covering for the staple yarn.

Likewise, selection of blend fiber and/or the actual yarn structure, for example, the length of the staple fluoropolymer or blend fibers, the placement of the staple fibers in the body of the yarn or the yarn twist, may be optimized to compensate for shrinkage or adhesion problems known to exist with fluoropolymer fibers.

The yarns of this invention may be used in low friction wound products or may be made into fabrics to be used in many load-bearing applications. In both the yarn and fabric forms, it is important that the fiber spin finish on the blend yarn be compatible with the fluoropolymer; that is, finishes applied to the blend fiber do not negatively impact the frictional performance of the yarn or the fabric. It is thought that the best fabric frictional performance is obtained when there is little or no finish on the blend yarn. Finish used in manufacture of the blend fiber may be removed by washing before the blend yarn is combined with the fluoropolymer yarn.

The yarns of this invention may be used in fabric liners for rubber parts to eliminate noise in suspension parts, such as stabilizer bar bushings used on automobiles and trucks. When used in this way, the spun yarn may be knit, woven, braided or sewn to make a fabric. The fabric is bonded to or combined with a backing material. This combination may then be formed into a tubular shape having as the inside surface the yarn or fabric of the present invention and as the outer surface, the backing material or the backing material bonded to rubber. Typically in the case of circular knitting, the backing material is plated into the tube; in warp knitting, the backing material is knit into the fabric structure; and in weaving, a velour fabric may be used where the face pile uses the spun yarn and the backing material is the bonding fiber. Other woven structures may be of interest as long as most of the spun fiber is on one side and most of the bonding fiber is on the other. Regardless of the method used to make the fabric, the resultant fabric needs to be impermeable to molten materials under high pressure such as injection-moldable rubbers.

The actual bearings or bushings are made by placing the resultant fabrics in tubular form over a mandrel which has a diameter equal to the diameter of the fabric tube. This assembly is put into a rubber mold for the rubber bushing desired and rubber is injected under high pressure until the mold is filled. Once the rubber is cooled the mold is opened and the mandrel removed. To increase efficiency several identical parts can be molded at once and then slit into individual parts. The individual bushings can either be installed by pushing the part over the end of the stabilizer bar or they can be split open then slipped over the bar.

The yarns of this invention may be used as fabrics for window seals to allow easy opening and closing the window. Fabrics made from 100% PTFE fibers are very soft due to the low modulus of the fibers, and their use can result in a poor seal or unwanted noise. It is clear the low modulus of the PTFE fibers can be overcome by selecting blending fibers that have a very high modulus such as para-aramid, PBO, or high molecular weight polyethylene. The resultant pile fabrics have low friction but improved stiffness for an improved seal.

Such fabrics can be any type of knit, braided or woven fabric but preferably pile fabrics such as a knit fleece or a woven velour fabric. The actual seal is formed by taking the fabric and attaching or laminating it to a mounting bracket that is installed in the door frame so that it rests under pressure against the window to form a seal which keeps out moisture and wind while allowing easy up and down motion of the window.

The yarns of this invention can also be used in fabric bearings which are not impregnated with thermoset resins. Fabric bearing made from 100% PTFE fiber can experience problems under some conditions; the natural tendency is for PTFE to cold flow, especially under continuous loads that exceed 10,000 psi. The yarns of this invention offer a practical solution to this problem, by combining the fluoropolymer fibers with other high strength, high modulus fibers to make possible a fabric having both improved weight bearing properties in combination with the lubricity and improved cold flow resistance. The preferred high modulus fibers useful in this spun yarn include para-aramid, PBO, carbon, glass, and UHMWPE fibers.

The yarns of this invention can also be used to make composite bearings. As described previously, the bearing is made by using either a fabric tube or flat fabric or individual yarns that have bonding fibers twisted around them and then wrapped around a mandrel that can be either round, hex, square or a variety of shapes. This is wetted with epoxy and then heat set. Glass fiber or some other reinforcing fiber is then filament wound around the core. This is then heat set and afterwards the tube is pushed off the core allowing it to be cut into individual bearings. The outer fiber reinforced surface can also be machined to a proper outer diameter. The use of thermoplastic fiber as the blend fiber in the yarn of this invention eliminates the need for the addition of the bonding fiber used in the making of bearings made according to the present invention. The elimination of the separate step of wrapping individual fluoropolymer yarns with a bonding fiber, or in the case of fabric tubes, the addition of blended staple yarns, means the epoxy can better wet and uniformly impregnate the wound yarn or fabric tube, resulting in a more uniform composite bearing. This results in fewer manufacturing defects and higher yields. By using blend fibers having either high temperature fibers with good abrasion resistance (aramids, PBO, and UHMWPE) or blend fibers having good thermal conductivity (graphite, metal, aramids coated with metals, carbon, and graphite filled fibers) bearings having broader operating ranges are possible.

The yarns of this invention are useful in other types of composite bearing such as those made by laminating fabrics to metal. This type of bearing benefits from a fabric that is thermally conductive. Fibers with good thermal conductivity allow higher operating velocities because heat dissipates from the fabric surface through the backing. This improvement increases the load carrying capability of the final parts and helps simplify the manufacturing process by eliminating the need for heat setting of the fabric.

As an additional advantage of the present invention, it has also been found that yarns containing less than 35 wt % fluoropolymer have additional benefits when used in bearings and bushings even though the frictional benefits are reduced. It has been found that yarn made with as little as 10% fluoropolymer fiber can significantly reduce the noise during operation of the bearing or bushing.

The following Example illustrates the present invention, but are not intended to limit the invention.

EXAMPLE

This example illustrates the performance of a fabric of the present invention in an automotive stabilizer bar bushing application.

Stabilizer bars are used in many automobiles to provide stiffness and stability in cornering. The bushings used in stabilizer bars are generally made of a 100% PTFE fiber knitted with polyester fiber such that the 100% PTFE fiber is exposed primarily on one face of the fabric (the PTFE face) while the other face of the fabric has exposed primarily polyester fiber. This fabric is molded into the bushing so that the PTFE face of the fabric contacts the metal surface of the stabilizer bar. Although costly these fabrics, having approximately 100% PTFE faces (~50% by weight PTFE) are preferred because they eliminate noise.

Test fabrics made according to the present invention, were knitted as described below and tested in an apparatus designed to simulate the stabilizer, bushing and housing assembly of a stabilizer bar system.

Figure 1B:
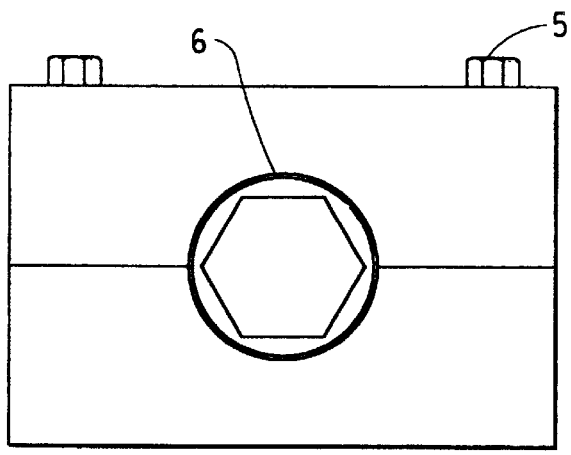
Figure 1C:
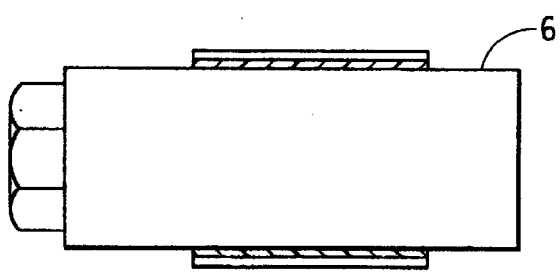

The apparatus and its components used in the testing are shown in FIGS. 1A to 1C. The apparatus consists of a split metal block which represents the housing and has the dimensions 4×3×1.5 inches. The block is cut so that there are two half-cylindrical cutouts in the face of each half of the split block. The top half of the split block, 1, has drilled through its body two ⅜ inch diameter holes, 3, through which bolts, 5, are inserted; the bottom half, 2, is tapped with ⅜ inch threads, 4, so that the two halves of the split block can be held together by a predetermined force applied to the bolts. In this apparatus the stabilizer bar is represented by a metal rod, 6, having a length of 4 inches and a diameter of 1 inch. To the top of this rod is welded a 1 inch diameter hexagonal head. The head allowed a torque wrench to be used to apply a turning force to the rod once it is secured in the housing.

The apparatus was assembled as follows to test fabrics:

The fabric strips to be tested were placed on a strip of rubber 1.5×3.5 inches and ⅛ of an inch thick. The rubber and fabric were wrapped around the rod with the PTFE fabric face in contact with the rod as in FIG. 1C, and the rod was positioned in the cutouts of the split block. The bolts were inserted into the drilled holes, and they were screwed into the threads pulling the two halves of the split block together. The bolts were tightened to a torque of 35 ft-lbs. This amount of torque assured that the rod and sample were tightly held in position between the two halves of the split block. The split block was secured to a bench top. The torque wrench was then attached to the hex head of the rod, and force was applied to the torque wrench to turn the rod. The amount of force required to break the rod free was measured in foot-pounds. The amount of force to continue to turn the rod after it broke free was also measured. As the rod was turned any noise produced was noted.

The fabrics tested were pleat knitted. This is the type of knitting used in making fabrics for use in stabilizer bar bushings, and this type of knitting allows two types of yarn to be knitted together such that one side of the knitted fabric has one yarn surface and the other side has the other yarn surface. Test fabrics were knitted using as one yarn 100% polyester and as the second yarn, blends of polyester and PTFE staple fiber according to the present invention. The control fabric had 100% PTFE yarn knitted with the polyester yarn. Just as in bushing manufacture, the polyester fabric side was placed next to the rubber strip and the PTFE staple fiber blend faced the metal rod as shown in FIG. 1C. In the test, as the rod turned, it turned against the fabric side containing the PTFE blend. The rubber strip was held fast in the split block.

Data from the test is shown below. Fabrics were characterized as the weight percent of PTFE in the PTFE/polyester blend staple yarn and by the total weight % of PTFE in the fabric. Because the fabric is knitted from two yarns the weight % of PTFE in the fabric is approximately one half that of the total yarn in the knitted fabric. The forces measured were the torque to break the rod free and to begin the rotation (the force to overcome inertia) and the rotating force. The torque was measured using a round beam torque wrench. In all cases of fabrics containing PTFE, as 100% of the fabric face or as a component of a blended staple yarn fabric face, no noise was heard in the breaking free of the rod or in the rotation of the rod.

| Yarn Wt % PTFE | Fabric Wt % PTFE | Force to Break | Force to rotate |
| --- | --- | --- | --- |
| 100 | 50 | 30 | 10 |
| 50 | 25 | 30 | 12–15 |
| 25 | 12.5 | 35 | 20 |

We claim:

1. A bearing, bushing or seal consisting essentially of a staple yarn containing fluoropolymer fibers and blend fibers wherein the fluoropolymer fibers represent from 10 to 90 weight percent of the yarn and blend fibers represent 90 to 10 weight percent of the yarn.

2. The bushing, bearing or seal of claim 1 wherein the fluoropolymer fibers represent 35 to 90 weight percent and the blend fibers represent 65 to 25 weight percent.

3. A bushing, bearing or seal comprising a staple yarn comprising a blend of 35 to 90 weight percent fluoropolymer staple fiber and 65 to 10 weight percent of one or more types of polyester blend staple fiber.

4. The bushing, bearing or seal comprising the yarn of claim 3 wherein the blend is from 35 to 75 weight percent fluoropolymer and from 65 to 25 weight percent blend fiber.

5. A bushing, bearing or seal comprising a staple yarn comprising a blend of 35 to 90 weight percent fluoropolymer staple fiber and 65 to 10 weight percent of one or more types of blend staple fiber wherein the fluoropolymer is selected from the group consisting of poly(tetrafluoroethylene), fluorinated olefinic polymers, copolymers of tetrafluoroethylene and hexafluoropropene, copolymers of tetrafluoroethylene and perfluoroalkyl-vinyl esters, and copolymers of perfluoroethyl-vinyl ether and fluorinated olefinic terpolymers and, the blend fiber is selected from fibers from the group consisting of polyesters, polyamides, aromatic polyamides, polypropylenes, polyethylenes and their copolymers, poly(para-phenylene terephthalamide), poly(meta-phenylene isophthalamide), poly(para-phenylene benzobisoxazole, ultrahigh molecular weight polyethylene, anisotropic melt polyesters, carbon fibers, metal fibers, glass fibers and metal-coated para-aramid fibers.

6. The bushing, bearing or seal comprising the yarn of claim 5 wherein the blend is from 35 to 65 weight percent fluoropolymer and from 65 to 35 weight percent blend fiber.

7. A bushing, bearing or seal comprising a staple yarn comprising a blend of 35 to 90 weight percent fluoropolymer staple fiber and 65 to 10 weight percent of one or more types of blend staple fiber wherein the blend staple fiber is poly(para-phenylene terephthalamide) or poly(meta-phenylene isophthalamide).

8. The bushing, bearing or seal comprising a low friction wound product comprising the yarn of claim 7.

9. A bushing, bearing or seal comprising a yarn comprising a continuous filament yarn and a yarn of a blend of staple fibers wherein the staple fibers comprise from 35 to 90 weight percent fluoropolymer staple fiber and 65 to 10 weight percent polyester blend staple fiber.

10. The bushing, bearing or seal comprising the yarn of claim 9 wherein the continuous filament yarn is substantially wrapped or overspun by the yarn of staple fibers.

11. A bushing, bearing or seal comprising a yarn comprising a continuous filament yarn and a yarn of a blend of staple fibers wherein the staple fibers comprise from 35 to 90 weight percent fluoropolymer staple fiber and 65 to 10 weight percent blend staple fiber wherein the continuous filament yarn substantially wraps the yarn of staple fibers.

* * * * *